United States Patent
Stathacopoulos et al.

(10) Patent No.: US 10,163,008 B2
(45) Date of Patent: Dec. 25, 2018

(54) SYSTEMS AND METHODS FOR RECREATING A REFERENCE IMAGE FROM A MEDIA ASSET

(71) Applicant: Rovi Guides, Inc., San Carlos, CA (US)

(72) Inventors: Paul T. Stathacopoulos, San Carlos, CA (US); Benjamin H. Maughan, Pleasanton, CA (US); Sean Matthews, Los Altos, CA (US)

(73) Assignee: Rovi Guides, Inc., San Jose, CA (US)

(*) Notice: Subject to any disclaimer, the term of this patent is extended or adjusted under 35 U.S.C. 154(b) by 54 days.

(21) Appl. No.: 15/284,832

(22) Filed: Oct. 4, 2016

(65) Prior Publication Data

US 2018/0096202 A1    Apr. 5, 2018

(51) Int. Cl.
| | |
|---|---|
| *G06K 9/00* | (2006.01) |
| *G06T 7/70* | (2017.01) |
| *G06F 3/0346* | (2013.01) |
| *G06K 9/62* | (2006.01) |
| *H04W 4/02* | (2018.01) |
| *G06F 17/30* | (2006.01) |
| *H04N 5/232* | (2006.01) |
| *G06T 7/73* | (2017.01) |

(52) U.S. Cl.
CPC ....... *G06K 9/00476* (2013.01); *G06F 3/0346* (2013.01); *G06F 17/30244* (2013.01); *G06K 9/6201* (2013.01); *G06T 7/70* (2017.01); *G06T 7/74* (2017.01); *H04N 5/23216* (2013.01); *H04W 4/026* (2013.01); *G06T 2215/16* (2013.01)

(58) Field of Classification Search
CPC .... G06F 3/0346; G06K 9/6201; H04W 4/026
See application file for complete search history.

(56) References Cited

U.S. PATENT DOCUMENTS

| | | | |
|---|---|---|---|
| 7,082,365 B2 * | 7/2006 | Sheha | G01C 21/3679 340/990 |
| 8,774,527 B1 | 7/2014 | Anguelov et al. | |
| 9,123,169 B2 * | 9/2015 | Nakagawa | G06T 7/344 |
| 2010/0185389 A1 * | 7/2010 | Woodard | G01C 21/3697 701/532 |
| 2011/0317810 A1 * | 12/2011 | Lee | A61B 6/00 378/62 |
| 2012/0114239 A1 * | 5/2012 | Flynn | G06K 9/00704 382/170 |

(Continued)

FOREIGN PATENT DOCUMENTS

EP    1 750 431    2/2007

*Primary Examiner* — Mekonen Bekele
(74) *Attorney, Agent, or Firm* — Haley Guiliano LLP

(57) ABSTRACT

Systems and methods that provide for an interactive media guidance application implemented in a user device, e.g., an app on a mobile phone. The interactive media guidance application uses the geographical location, e.g., longitude and latitude coordinates, and geospatial orientation, e.g., gyroscopic angles, of the user device to allow the user to capture images of the location in the same manner as the location was depicted in his or her favorite film or television program. The interactive media guidance application can deliver to the user the desired immersive experience where he or she sees and has the same viewpoint as the director or another person associated with the film or television program.

20 Claims, 9 Drawing Sheets

(56) References Cited

U.S. PATENT DOCUMENTS

| | | | |
|---|---|---|---|
| 2012/0183172 A1* | 7/2012 | Stroila | G01C 21/3602 |
| | | | 382/100 |
| 2012/0323690 A1* | 12/2012 | Michael | G06Q 30/02 |
| | | | 705/14.58 |
| 2014/0173437 A1* | 6/2014 | Pugh | G11B 27/034 |
| | | | 715/723 |
| 2014/0189849 A1 | 7/2014 | Cudak et al. | |
| 2014/0277897 A1* | 9/2014 | Saiz | B60W 10/06 |
| | | | 701/23 |
| 2015/0012207 A1* | 1/2015 | Tate, Jr. | G01C 21/00 |
| | | | 701/123 |
| 2015/0097707 A1* | 4/2015 | Nelson, Jr. | G08B 6/00 |
| | | | 340/984 |
| 2017/0132698 A1* | 5/2017 | Shifman | G06Q 30/08 |

\* cited by examiner

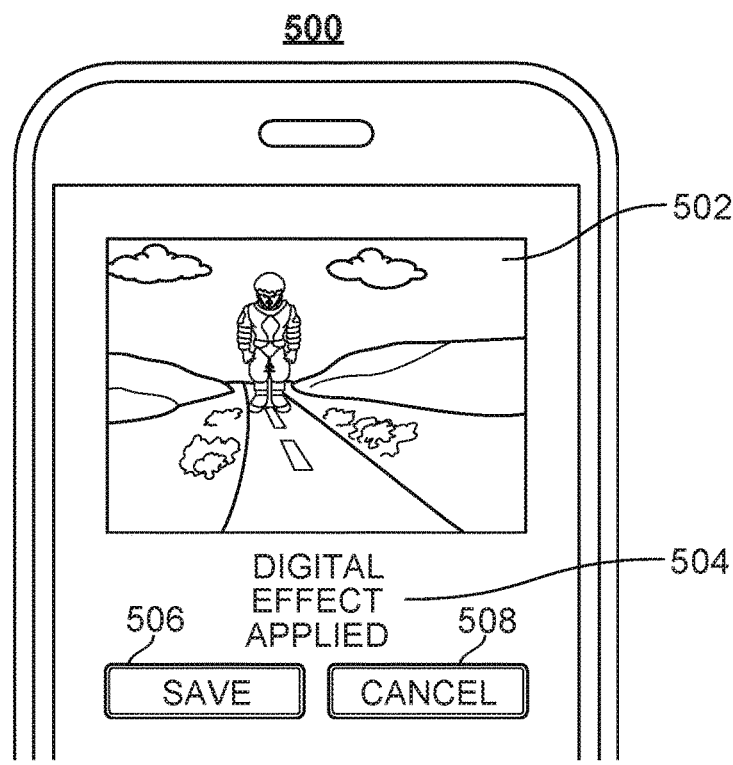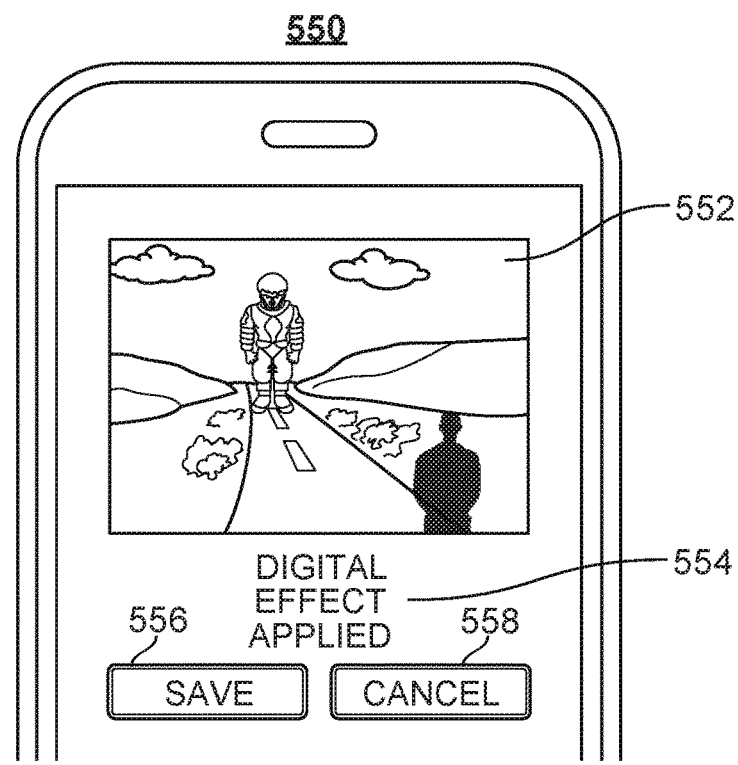
FIG. 5

600 ⤵

<user-captured image> ⟋602
    <geographical location> ⟋604
        <Latitude> 47.6N </latitude> ⟋606
        <Longitude> 122.3W </longitude> ⟋608
    </geographical location>
    <geospatial orientation> ⟋610
        <gyroscopic angle1> 90°</gyroscopic angle1> ⟋612
        ......
    </geospatial orientation>
    ......
</user-captured image>
<reference image> ⟋614
    <geographical location> ⟋616
        <Latitude> 47.5N </latitude> ⟋618
        <Longitude> 122.4W </longitude> ⟋620
    </geographical location>
    <geospatial orientation> ⟋622
        <gyroscopic angle1> 85° </gyroscopic angle1> ⟋624
        ......
    </geospatial orientation>
    <media asset> ⟋626
        <title> robot in sunset </title> ⟋628
        <timestamp> 10:45 </timestamp> ⟋630
        <digital effect> robot.overlay </digital effect> ⟋632
        ......
    </media asset>
    ......
</reference image>

FIG. 6

SYSTEMS AND METHODS FOR RECREATING A REFERENCE IMAGE FROM A MEDIA ASSET

BACKGROUND

Some film and television fans love to explore locations where their favorite scenes were recorded in an attempt to view and experience in a physical location what they experienced in their favorite film or television program. For example, fans of the "Lord of the Rings" films may travel to New Zealand to see where their favorite scenes were recorded. In another example, fans of the "Game of Thrones" television program may travel to Northern Ireland to see where their favorite scenes were recorded. The fans may want to create an immersive experience where they see and have the same viewpoint as the director of the film or television program. However, after arriving at their destination, e.g., using a global positioning system (GPS) device, the fans may find it difficult to figure out the exact location and/or camera angles from which their favorite scenes were recorded. The location may also appear unfamiliar to the fans due to digital enhancement of the scenes after they were recorded. As such, the fans may be unable to recreate in real life scenes from their favorite film or television program.

SUMMARY

Systems and methods are described to address shortcomings in conventional systems used for capturing images of a location featured in a media asset, such as a film or a television program. Conventional systems implemented in a user device, e.g., a mobile phone, may allow a user to find the location featured in the media asset using geographical information, e.g., GPS coordinates (longitude and latitude coordinates). However, this information may not be sufficient for the user to capture an image of the location that corresponds with the manner in which the location was depicted in his or her favorite film or television program. The user may want to create an immersive experience where he or she sees and has the same viewpoint as the director or another person associated with the film or television program.

The described systems and methods provide for an interactive media guidance application implemented in a user device, e.g., an app on a mobile phone. The user device may include a camera component for capturing images and/or display component for displaying the captured images. The interactive media guidance application uses the geographical location, e.g., longitude and latitude coordinates, and geospatial orientation, e.g., gyroscopic angles, of the user device to allow the user to capture images of the location in the same manner as the location was depicted in his or her favorite film or television program. The interactive media guidance application can deliver to the user the desired immersive experience where he or she sees and has the same viewpoint as the director or another person associated with the film or television program.

In some aspects, the interactive media guidance application captures an image from the camera embedded in the user device at the current location and associated metadata such as geographical location and geospatial orientation. For example, the geographical location, including longitude and latitude coordinates, may be obtained from a GPS component in the user device. In another example, the geospatial orientation, including gyroscopic angles, may be obtained from one or more gyroscopic components in the user device.

The interactive media guidance application may search a database to identify a reference image from a media asset, such as a film or television program, corresponding to the geographical location and/or geospatial orientation of the user-captured image. The corresponding reference image may include metadata having geographical location and/or geospatial orientation. This information may be captured at the time the film or television program is recorded or appended at a later time when being added to the database. For example, the information may be captured at the time a portion of a scene is recorded at a location and is then used to maintain continuity when the next portion of the scene is recorded at the same location. In another example, the information may be captured in order to assist with post-recording enhancements that may be applied to the recorded scene. This database may be provided to fans of the film or television program to access the information needed to recreate scenes from their favorite film or television program.

In some embodiments, the user may want to see and have the same viewpoint as the director or another person associated with the film or television program and also recreate the digitally enhanced scene as intended by the person. Because typical films and television programs are digitally enhanced with digital sets and scenery overlaid on the images from the filmed location, allowing the user to recreate the digital enhanced scene may allow for an immersive and physical entertainment experience. Conventional systems relying on geographical information cannot provide such an experience. They cannot recreate the camera view and angle of the filmed location and cannot recreate an augmented reality version of the scene that includes the digital enhancements applied in the scene as seen in the user's favorite film or television program.

In some aspects, the described systems and methods provide for an interactive media guidance application implemented on a user device for recreating a scene from a media asset, such a film or a television program. The interactive media guidance application receives the geographical location and the geospatial orientation of the user device. The interactive media guidance application determines a reference image for the scene that the user is trying to recreate using the geographical location. Additionally or alternatively, the user provides information regarding the particular scene to the interactive media guidance application. The interactive media guidance application determines whether the geospatial orientation of the user device corresponds with the geospatial orientation associated with the reference image. If the geospatial orientations do not match, the interactive media guidance application notifies the user to change the position of the user device to match the geographical location and/or geospatial orientation of the reference image. The notification may be in the form of audio or visual cues displayed on the user device. The interactive media guidance application may continue providing feedback to the user regarding the position of the user device until the geospatial orientations match. Subsequently, the interactive media guidance application may allow the user to capture an image via the user device.

Additionally or alternatively, the interactive media guidance application allows the user to overlay a digital effect or enhancement to the user-captured image. This allows the user to recreate an augmented reality version of the captured image that includes the digital enhancements applied in the image as seen in the user's favorite film or television program. Additionally or alternatively, the interactive media guidance application may provide audio or visual cues to assist the user to follow camera movements as they were made by a camera during the original recording of the scene. The audio or visual cues may guide the user to change the position of the user device and adjust its geographical location and/or geospatial orientation to recreate the camera movements during the original recording. The user may capture images as he or she changes the position of the user device to record a recreation of his or her favorite scene. Additionally or alternatively, the user may include friends and/or family in the recreated scene and record their own customized version of the scene for later viewing.

In some embodiments, the interactive media guidance application is implemented in the form of an app on a user device, such as a mobile device. The interactive media guidance application captures an image from the current position of the mobile device and generates the image for display to the user. The user may have positioned the user device in a geographical location and/or geospatial orientation corresponding to a scene from his or her favorite film or television program. For example, the user's favorite film may be "Sunset" and the user may have traveled to the physical location where his or her favorite scene from the film was recorded. The interactive media guidance application may analyze the geographical location and/or geospatial orientation of the captured image to determine a reference image corresponding to the scene and whether the captured image correctly recreates the reference image. For example, the interactive media guidance application may determine that the user is interested in a scene from the film "Sunset" based on the geographical location of the user device being latitude 47.6° N and longitude 122.3° W. In another example, the interactive media guidance application may receive an indication from the user that his or her favorite film is "Sunset" and subsequently search a database for reference images matching the geographical location of the user device. For example, the interactive media guidance application may find a reference image having an associated geographical location of latitude 47.5° N and longitude 122.4° W.

In some embodiments, the interactive media guidance application provides audio or visual cues to the user to change the position of the user device. The interactive media guidance application may receive metadata for the captured image including geographical location and/or geospatial orientation of the user device when the image was captured. The interactive media guidance application may retrieve metadata including geographical location and/or geospatial orientation for the reference image. The interactive media guidance application may compare the metadata to determine whether the captured image corresponds with the reference image. For example, the interactive media guidance application may determine whether the geospatial orientation of the captured image, e.g., gyroscopic angle 90°, corresponds with the geospatial orientation of the reference image, e.g., gyroscopic angle 85°.

The interactive media guidance application may determine a deviation between the metadata of the captured image and the reference image and generate audio or visual cues to assist the user in changing the position of the user device. For example, the interactive media guidance application may generate a set of static arrows (or other directional indicators) and a set of dynamic arrows (or other directional indicators) on the user device. The interactive media guidance application may update the dynamic arrows (or other directional indicators) as the user changes the position of the user device in an attempt to match the static arrows (or other directional indicators) and the dynamic arrows (or other directional indicators). The interactive media guidance application may overlay the static arrows (or other directional indicators) and the dynamic arrows (or other directional indicators) on an image of the location as it is captured from the new position of the user device. In another example, the interactive media guidance application may generate audio cues indicating whether the user should move the user device up, down, left, right, forward, backward, tilt, or another suitable change in position.

In some embodiments, the interactive media guidance application detects that the position of the user device is calibrated in a manner that corresponds with the metadata for the reference image. For example, the reference image from the user's favorite scene may have associated metadata including geographical location and/or geospatial orientation. The prior position of the user device may have corresponded with the geographical location but may have deviated from the geospatial orientation. After the user changes the position of the user device, the interactive media guidance application may compare the current geospatial orientation of the user device and the geospatial orientation of the reference. The interactive media guidance application may determine the position of the user device is calibrated because the geospatial orientations were a match. The interactive media guidance application may update the user device's display to indicate the match, e.g., by generating a notification and/or generating static and dynamic arrows on top of each other or in close proximity of each other.

In some embodiments, the interactive media guidance application overlays a digital effect or enhancement on a user-captured image. Subsequent to calibration of the user device with the metadata of the reference image, the interactive media guidance application may present the user with an option to overlay a digital effect or enhancement to the image captured by the user device. Because typical films and television programs are digitally enhanced with digital sets and scenery overlaid on the images from the filmed location, allowing the user to recreate the digital enhanced scene may allow for an immersive and physical entertainment experience. By overlaying the digital effect or enhancement to the image, the user may recreate an augmented reality version of the scene as seen in the user's favorite film or television program. The interactive media guidance application may use a three-dimensional rendering engine and a database of digital overlay assets from the original rendered media asset to apply the digital overlay assets to the user-captured images based on the geographical location and/or the geospatial orientation of the captured images. With the digital effects or enhancements composited over the images being captured by the user device, the user may move around the user device and interact within the digitally enhanced scene as the director or another person associated with the film or television program intended the scene to look.

In some embodiments, an image captured by the user device is associated with metadata stored in a user-captured image data structure. This data structure may include a geographical location and/or geospatial orientation for the captured image. For example, the data structure may include a geographical location including latitude 47.6° N and longitude 122.3° W and a geospatial orientation including gyroscopic angle 90°. In some embodiments, a reference image from a media asset is associated with metadata stored in a reference image data structure. This data structure may include a geographical location and/or geospatial orientation for the reference image. For example, the data structure may include a geographical location including latitude 47.5° N and longitude 122.4° W and a geospatial orientation including gyroscopic angle 85°. This information may be stored at the time the reference image from the media asset is recorded or appended at a later time. This data structure may include information regarding the media asset, such as title, e.g., "Sunset," a timestamp for the reference image, e.g., "10:45," and a digital overlay asset, such as "robot.overlay."

In some aspects, the described systems and methods provide for an interactive media guidance application for recreating on a user device a reference image from a media asset. The interactive media guidance application receives a user image captured by a user device. The interactive media guidance application identifies the reference image from the media asset. The interactive media guidance application determines whether a first geospatial orientation of the user image matches a second geospatial orientation of the reference image. The interactive media guidance application generates a notification for a user to change a position of the user device based on the first geospatial orientation not matching the second geospatial orientation.

In some aspects, the described systems and methods provide for an interactive media guidance application for recreating on a user device a reference image from a media asset. The interactive media guidance application receives a user image captured by a user device. For example, the user device may include a camera component that captures an image at the user's current location, stores the image in a memory of the user device, and transmits the captured image to the interactive media guidance application.

The interactive media guidance application determines a geographical location associated with the user image. In some embodiments, the geographical location includes at least one of a latitude coordinate and a longitude coordinate. In some embodiments, at least one of the geographical location and the first geospatial orientation associated with the user image is determined from metadata extracted from the user image. For example, the interactive media guidance application may extract metadata from the captured image, analyze the extracted metadata for a data structure including geographical location information, such as latitude and longitude, and retrieve the geographical location from the data structure. For example, the interactive media guidance application may determine the geographical location associated with the user image to be latitude 47.6° N and longitude 122.3° W.

Based on the determined geographical location, the interactive media guidance application identifies, from a database, the reference image from the media asset. In some embodiments, the database includes the media asset and the reference image tagged with the geographical location. In some embodiments, the interactive media guidance application receives, from the user, an indication of the media asset. The interactive media guidance application identifies, from the database, the reference image from the media asset based on the determined geographical location and the indication of the media asset. For example, the interactive media guidance application may transmit a query to the database using the geographical location associated with the user image of latitude 47.6° N and longitude 122.3° W. The interactive media guidance application may include a threshold range of, e.g., +0.5° and −0.5°. The interactive media guidance application may receive a response from the database indicating the reference image having an associated geographical location of latitude 47.5° N and longitude 122.4° W. The interactive media guidance application may select the reference image as the closest match based on the geographical location of the user image.

The interactive media guidance application determines a first geospatial orientation associated with the user image. In some embodiments, the first geospatial orientation includes one or more gyroscopic angles. In some embodiments, at least one of the geographical location and the first geospatial orientation associated with the user image is determined from metadata extracted from the user image. For example, the interactive media guidance application may extract metadata from the reference image. The interactive media guidance application may analyze the extracted metadata for a data structure including geospatial orientation information. For example, the interactive media guidance application may determine the geospatial orientation associated with the user image to include a gyroscopic angle of 90°.

The interactive media guidance application receives a second geospatial orientation associated with the reference image. In some embodiments, the second geospatial orientation includes one or more gyroscopic angles. For example, the interactive media guidance application may receive the geospatial orientation associated with the reference image to include a gyroscopic angle of 85°.

The interactive media guidance application determines whether the first geospatial orientation matches the second geospatial orientation. For example, the interactive media guidance application may subtract the user image's gyroscopic angle of 90° from the reference image's gyroscopic angle of 85° and determine that the images do not match based on a non-zero result.

Based on the first geospatial orientation not matching the second geospatial orientation, the interactive media guidance application determines a deviation between the first geospatial orientation and the second geospatial orientation. For example, the interactive media guidance application may subtract the user image's gyroscopic angle of 90° from the reference image's gyroscopic angle of 85° and determine the deviation to be 5°.

The interactive media guidance application generates a notification for a user to change a position of the user device based on the deviation. For example, the interactive media guidance application may generate a notification for a user to change the position of the user device and transmit for display on the user device's display component. The interactive media guidance application may generate a set of static arrows and a set of dynamic arrows to be overlaid on the user image as it is being displayed on the user device. The set of dynamic arrows may be displaced with respect to the set of static arrows to indicate the deviation between the gyroscopic orientations. As the user changes position, the two sets of arrows may line up and indicate that the deviation between the gyroscopic orientations is decreasing.

In some embodiments, based on the deviation between the first geospatial orientation and the second geospatial orientation being below a predefined threshold, the interactive media guidance application overlays a digital effect on the user image. For example, after the deviation between the geospatial orientations reaches within the predefined threshold, e.g., 0.5°, the interactive media guidance application may overlay the digital effect on the user image. The interactive media guidance application may retrieve information regarding the digital effect from the metadata associated with the reference image, e.g., "robot.overlay." The interactive media guidance application may retrieve the digital effect asset from the database and initiate a digital image processing algorithm to apply the digital effect to the user image. For example, the interactive media guidance application may compare each pixel of the digital effect asset with respect to the user image and alter the pixels in the user image where the digital effect is expected to be applied but not alter the pixels in the user image where the digital effect is not expected to be applied.

In some embodiments, subsequent to overlaying the digital effect on the user image, the interactive media guidance application generates another notification for the user to change the position of the user device. For example, the interactive media guidance application may generate another notification for the user to change the position of the user device to capture an image for the next frame in the scene. The interactive media guidance application may transmit for display on the user device's display component. The interactive media guidance application may generate a set of static arrows and a set of dynamic arrows to be overlaid on the user image as it is being displayed on the user device. The set of dynamic arrows may be displaced with respect to the set of static arrows to indicate the deviation between the gyroscopic orientations. As the user changes position, the two sets of arrows may line up and indicate that the deviation between the gyroscopic orientations is decreasing.

In some embodiments, the interactive media guidance application receives a second user image captured by the user device. The interactive media guidance application identifies, from the database, a second reference image from the media asset. For example, the camera component in the user device may capture an image at the user's current location, store the image in a memory of the user device, and transmit the captured image to the interactive media guidance application. The interactive media guidance application may extract metadata from the captured image, analyze the extracted metadata for a data structure including geographical location information, such as latitude and longitude, and retrieve the geographical location from the data structure.

In some embodiments, based on a second deviation between geospatial orientation for the second user image and geospatial orientation for the second reference image being below the predefined threshold, the interactive media guidance application overlays a second digital effect on the second user image. For example, after the deviation between the geospatial orientations reaches within the predefined threshold, e.g., 0.5°, the interactive media guidance application may overlay the digital effect on the user image. The interactive media guidance application may retrieve information regarding the digital effect from the metadata associated with the reference image, e.g., "robot2.overlay." The interactive media guidance application may retrieve the digital effect asset from the database and initiate a digital image processing algorithm to apply the digital effect to the user image. For example, the interactive media guidance application may compare each pixel of the digital effect asset with respect to the user image and alter the pixels in the user image where the digital effect is expected to be applied but not alter the pixels in the user image where the digital effect is not expected to be applied.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 shows illustrative examples of display screens generated by a media guidance application in accordance with some embodiments of the disclosure;

FIG. 6 shows an illustrative example of a user image data structure and a reference image data structure in accordance with some embodiments of the disclosure;

DETAILED DESCRIPTION

Figure 1:
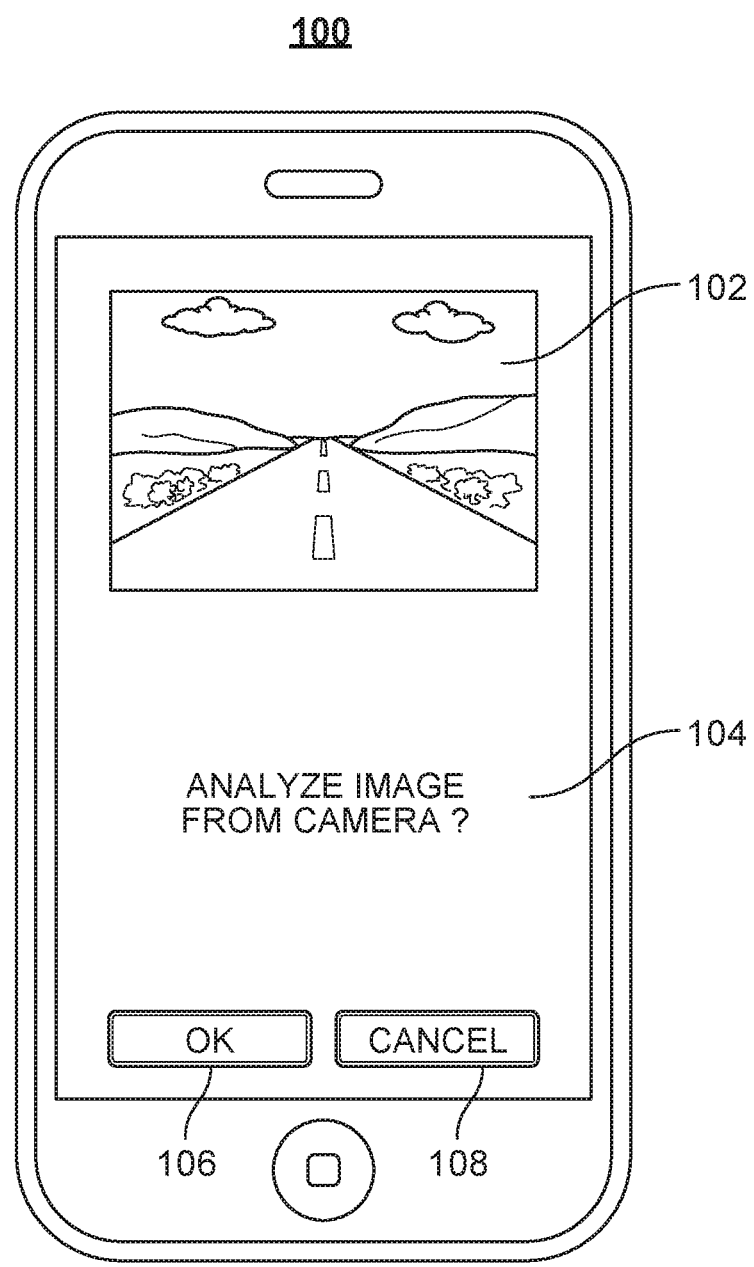
FIG. 1 shows an illustrative example of a display screen generated by a media guidance application in accordance with some embodiments of the disclosure.

Systems and methods are described to address shortcomings in conventional systems used for capturing images of a location featured in a media asset, such as a film or a television program. The user may want to create an immersive experience where he or she sees and has the same viewpoint as the director or another person associated with the film or television program. The described systems and methods provide for an interactive media guidance application implemented on control circuitry (e.g., control circuitry 904, FIG. 9) of a user device (e.g., user equipment device 900, FIG. 9), e.g., an app on a mobile phone. The user device (e.g., user equipment device 900, FIG. 9) may include a camera component for capturing images and/or display component (e.g., display 912, FIG. 9) for displaying the captured images. The interactive media guidance application uses the geographical location, e.g., longitude and latitude coordinates, and geospatial orientation, e.g., gyroscopic angles, of the user device to allow the user to capture images of the location in the same manner as the location was depicted in his or her favorite film or television program. The interactive media guidance application can deliver to the user the desired immersive experience where he or she sees and has the same viewpoint as the director or another person associated with the film or television program.

In some aspects, the described systems and methods provide for an interactive media guidance application, implemented on control circuitry (e.g., control circuitry 904, FIG. 9) of a user device (e.g., user equipment device 900, FIG. 9), for recreating on a user device a reference image from a media asset. The interactive media guidance application receives a user image captured by the user device. The interactive media guidance application identifies the reference image from the media asset. The interactive media guidance application determines whether a first geospatial orientation of the user image matches a second geospatial orientation of the reference image. The interactive media guidance application generates a notification for a user to change a position of the user device based on the first geospatial orientation not matching the second geospatial orientation.

In some aspects, the interactive media guidance application, implemented on control circuitry (e.g., control circuitry 904, FIG. 9) of a user device (e.g., user equipment device 900, FIG. 9), captures an image of the user's current location on the user device and associated metadata such as geographical location and geospatial orientation. For example, the geographical location, including longitude and latitude coordinates, may be obtained from a GPS component in the user device. In another example, the geospatial orientation, including gyroscopic angles, may be obtained from one or more gyroscopic components in the user device. The interactive media guidance application may search a database, e.g., media content source 1016 or media guidance data source 1018 (FIG. 10), to identify a reference image from a media asset, such as a film or television program, corresponding to the geographical location and/or geospatial orientation of the user-captured image. The corresponding reference image may include metadata having geographical location and/or geospatial orientation. This information may be captured at the time the film or television program is recorded or appended at a later time when being added to the database. For example, the information may be captured at the time a portion of a scene is recorded at a location and is then used to maintain continuity when the next portion of the scene is recorded at the same location. In another example, the information may be captured in order to assist with post-recording enhancements that may be applied to the recorded scene. This database may be provided to fans of the film or television program to access the information needed to recreate scenes from their favorite film or television program.

In some aspects, the described systems and methods provide for an interactive media guidance application, implemented on control circuitry (e.g., control circuitry 904, FIG. 9) of a user device (e.g., user equipment device 900, FIG. 9), for recreating a scene from a media asset, such a film or a television program. The interactive media guidance application receives the geographical location and the geospatial orientation of the user device. The interactive media guidance application determines a reference image for the scene that the user is trying to recreate using the geographical location. Additionally or alternatively, the user provides information regarding the particular scene to the interactive media guidance application. For example, the user may select the movie featuring the particular scene in order to aid the interactive media guidance application in determining the reference image. In another example, the user may select the particular scene itself in order to aid the interactive media guidance application in determining the reference image. The interactive media guidance application determines whether the geospatial orientation of the user device corresponds with the geospatial orientation associated with the reference image. If the geospatial orientations do not match, the interactive media guidance application notifies the user to change the position of the user device to match the geospatial orientation of the reference image. The notification may be in the form of audio or visual cues displayed on the user device. The interactive media guidance application may continue providing feedback to the user regarding the position of the user device until the geospatial orientations match. Subsequently, the interactive media guidance application may allow the user to capture an image via the user device.

Additionally or alternatively, the interactive media guidance application, implemented on control circuitry (e.g., control circuitry 904, FIG. 9) of a user device (e.g., user equipment device 900, FIG. 9), allows the user to overlay a digital effect or enhancement to the user-captured image. This allows the user to recreate an augmented reality version of the captured image that includes the digital enhancements applied in the image as seen in the user's favorite film or television program. Additionally or alternatively, the interactive media guidance application may provide audio or visual cues to assist the user to follow camera movements as they were made by a camera during the original recording of the scene. The audio or visual cues may guide the user to change the position of the user device and adjust its geographical location and/or geospatial orientation to recreate the camera movements during the original recording. The user may capture images as he or she changes the position of the user device to record a recreation of his or her favorite scene. Additionally or alternatively, the user may include friends and/or family in the recreated scene and record their own customized version of the scene for later viewing.

FIG. 1 shows an illustrative example of display screen 100 generated by a media guidance application in accordance with some embodiments of the disclosure. In some embodiments, the interactive media guidance application is implemented in the form of an app on a user device, such as a mobile device. The interactive media guidance application captures image 102 from the current position of the mobile device and generates the image for display to the user. The interactive guidance application generates for display prompt 104 to analyze the image. The user may select option 106 to analyze the image or option 108 to dismiss the prompt. The user may have positioned the user device in a geographical location and/or geospatial orientation corresponding to a scene from his or her favorite film or television program. For example, the user's favorite film may be "Sunset" and the user may have traveled to the physical location where his or her favorite scene from the film was recorded. If the user selects option 106, the interactive media guidance application may analyze the geographical location and/or geospatial orientation of the captured image to determine a reference image corresponding to the scene and whether the captured image correctly recreates the reference image. For example, the interactive media guidance application may determine that the user is interested in a scene from the film "Sunset" based on the geographical location of the user device being latitude 47.6° N and longitude 122.3° W. In another example, the interactive media guidance application may receive an indication from the user that his or her favorite film is "Sunset" and subsequently search a database for reference images matching the geographical location of the user device. For example, the interactive media guidance application may find a reference image having associated geographical location of latitude 47.5° N and longitude 122.4° W.

Figure 2:
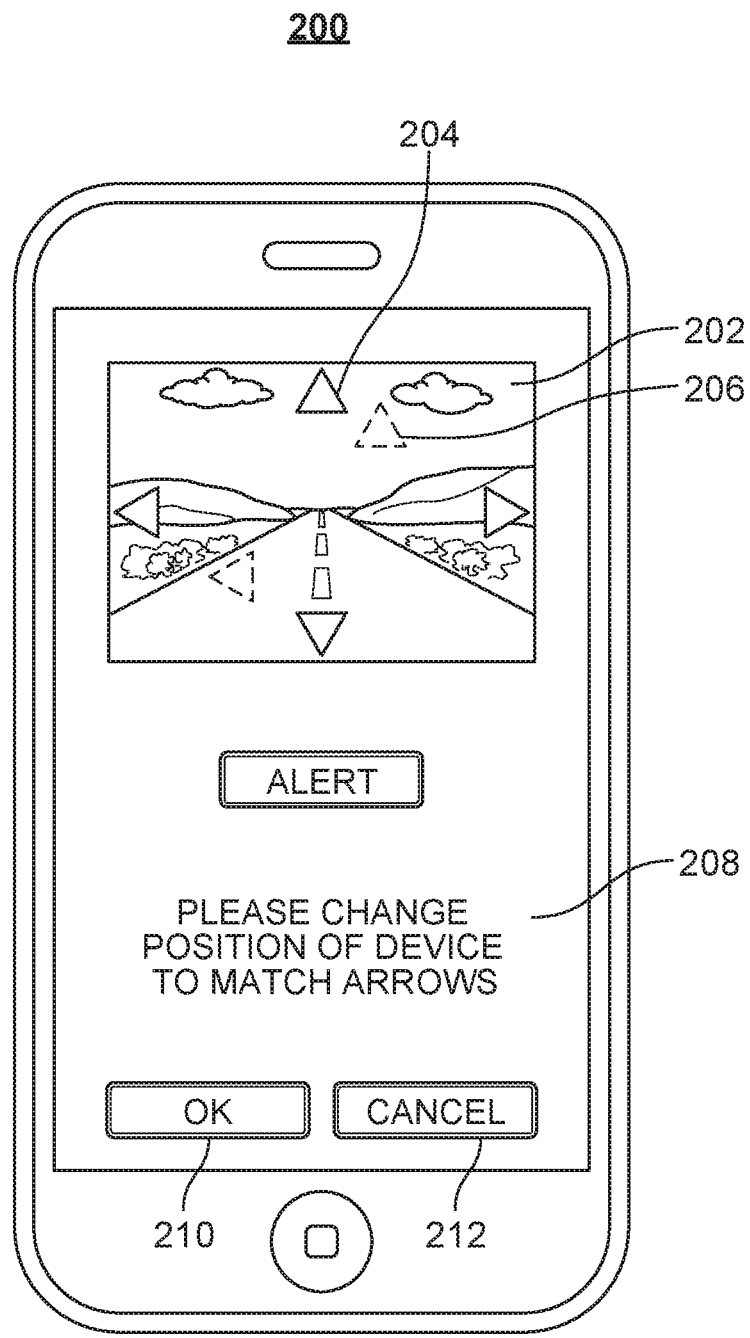
FIG. 2 shows another illustrative example of a display screen generated by a media guidance application in accordance with some embodiments of the disclosure.
Figure 3:
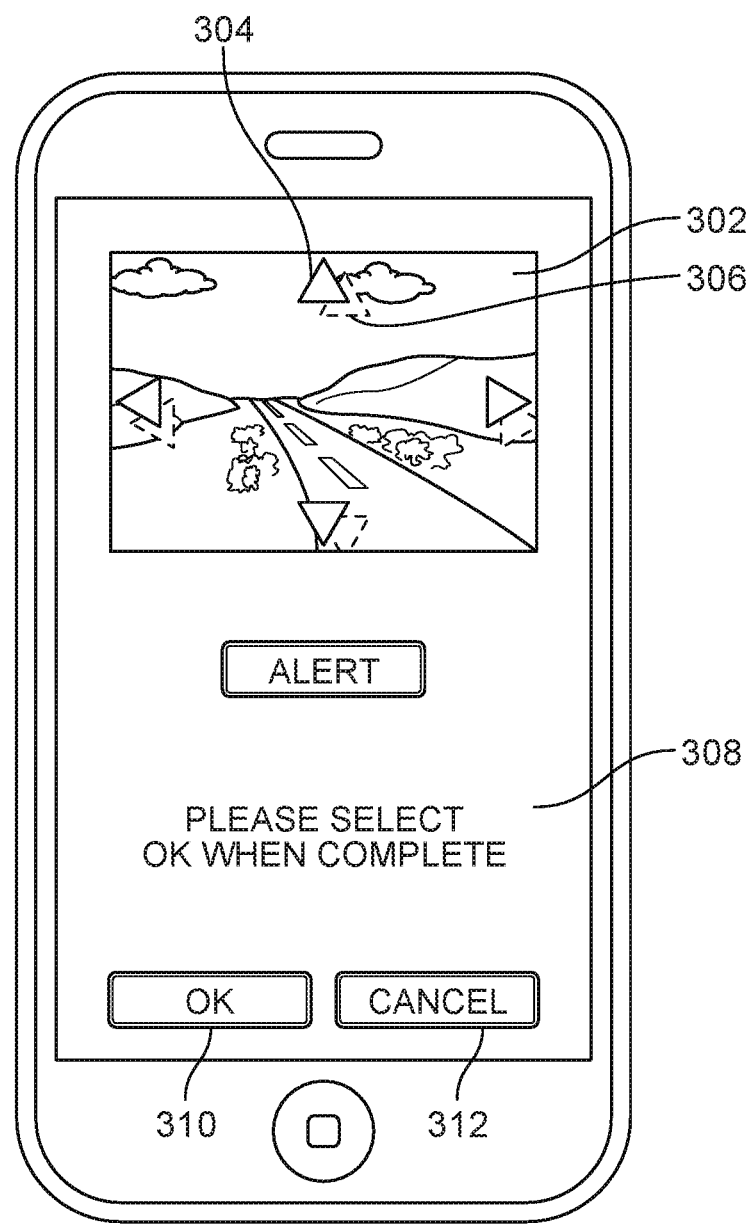
FIG. 3 shows yet another illustrative example of a display screen generated by a media guidance application in accordance with some embodiments of the disclosure.

FIGS. 2-3 shows illustrative examples of display screens 200 and 300 generated by a media guidance application in accordance with some embodiments of the disclosure. In some embodiments, the interactive media guidance application provides audio or visual cues to the user to change the position of the user device. The interactive media guidance application may receive metadata for captured image 202 including geographical location and/or geospatial orientation of the user device when the image was captured. The interactive media guidance application may retrieve metadata including geographical location and/or geospatial orientation for the reference image. The interactive media guidance application may compare the metadata to determine whether the captured image corresponds with the reference image. For example, the interactive media guidance application may determine whether the geospatial orientation of the captured image, e.g., gyroscopic angle 90°, corresponds with the geospatial orientation of the reference image, e.g., gyroscopic angle 85°.

The interactive media guidance application may determine a deviation between the metadata of the captured image and the reference image and generate audio or visual cues 204, 206, and 208 to assist the user in changing the position of the user device. For example, the interactive media guidance application may generate a set of static arrows 204 and a set of dynamic arrows 206 along with notification 208 on the user device. The interactive media guidance application may update dynamic arrows 306 as the user changes the position of the user device in an attempt to match static arrows 304 and dynamic arrows 306. The interactive media guidance application may overlay static arrows 304 and dynamic arrows 306 on image 302 of the location as it is captured from the new position of the user device. In another example, the interactive media guidance application may generate audio cues indicating whether the user should move the user device up, down, left, right, forward, backward, tilt, or another suitable change in position. After the calibration is complete, the user may select option 210, 310 to proceed or select option 212, 312 to dismiss the process. The interactive media guidance application may notify the user to select the appropriate option when calibration is complete via notification 308. Additionally or alternatively, the interactive media guidance application may automatically detect calibration and notify the user as discussed further below.

Figure 4:
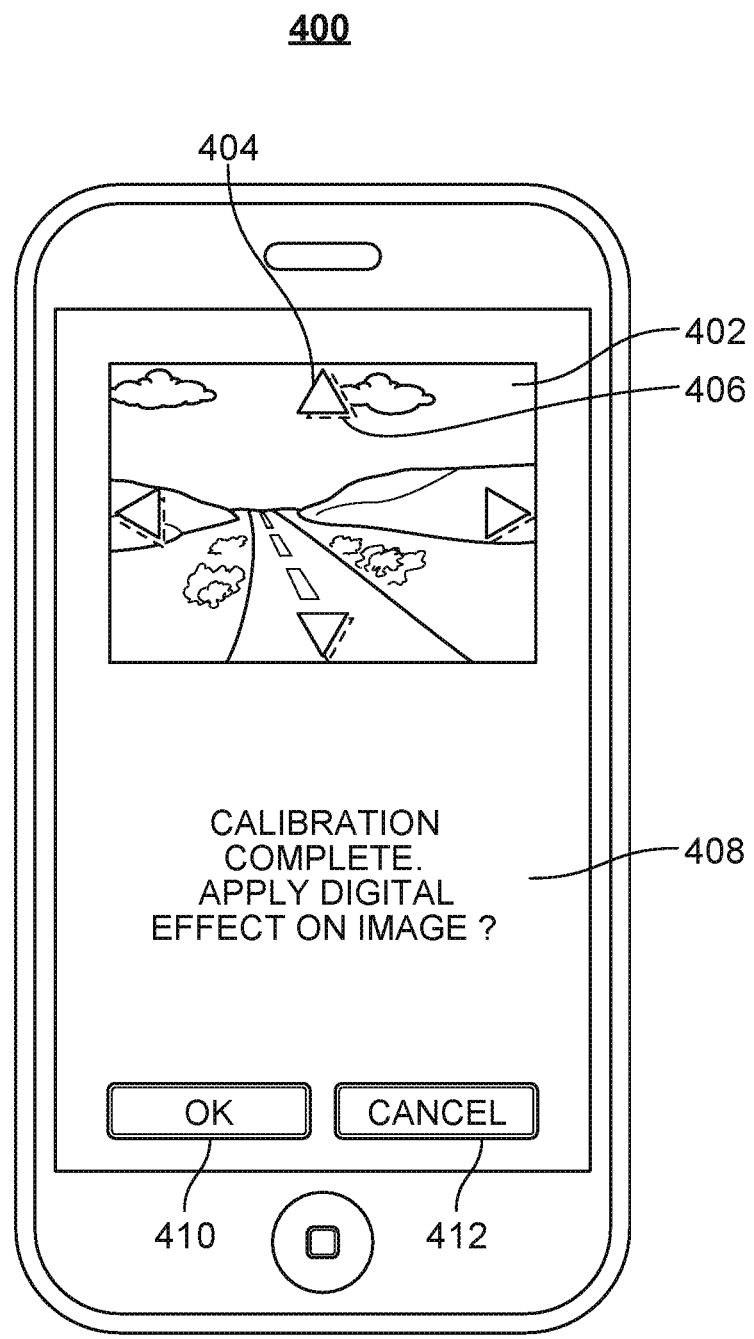
FIG. 4 shows yet another illustrative example of a display screen generated by a media guidance application in accordance with some embodiments of the disclosure.

FIG. 4 shows an illustrative example of display screen 400 generated by a media guidance application in accordance with some embodiments of the disclosure. In some embodiments, the interactive media guidance application receives input from the user indicating the calibration is complete. In some embodiments, the interactive media guidance application detects that the position of the user device is calibrated in a manner that corresponds with the metadata for the reference image. For example, the reference image from the user's favorite scene may have associated metadata including geographical location and/or geospatial orientation. The prior position of the user device may have corresponded with the geographical location but may have deviated from the geospatial orientation. After the user changes the position of the user device, the interactive media guidance application may compare the current geospatial orientation of the user device and the geospatial orientation of the reference. The interactive media guidance application may determine the position of the user device is calibrated because the geospatial orientations were a match. The interactive media guidance application may update the user device's display to indicate the match, e.g., by generating for display image 402 overlaid with static arrows 404 and dynamic arrows 406 on top of each other or in close proximity of each other along with notification 408. The user may select option 410 to proceed to the next step and apply a digital effect on the image or select option 412 to dismiss the process.

FIG. 5 shows an illustrative example of display screen 500 generated by a media guidance application in accordance with some embodiments of the disclosure. In some embodiments, the interactive media guidance application overlays a digital effect or enhancement on a user-captured image. Subsequent to calibration of the user device with the metadata of the reference image, the interactive media guidance application may present the user with an option to overlay a digital effect or enhancement to the image captured by the user device as illustrated in FIG. 4. Because typical films and television programs are digitally enhanced with digital sets and scenery overlaid on the images from the filmed location, allowing the user to recreate the digital enhanced scene may allow for an immersive and physical entertainment experience. By overlaying the digital effect or enhancement to the image, the user may recreate an augmented reality version of the scene as seen in the user's favorite film or television program. The interactive media guidance application may use a three-dimensional rendering engine and a digital overlay asset from the original rendered media asset to apply the digital overlay asset to user-captured image 502 based on the geographical location and/or the geospatial orientation of the captured image. The interactive media guidance application may generate for display notification 504 indicating the digital effect has been applied and provide option 506 to save the image or option 508 to dismiss the process. With the digital effects or enhancements composited over the images being captured by the user device, the user may move around the user device and interact within the digitally enhanced scene as the director or another person associated with the film or television program intended the scene to look.

FIG. 5 also shows another illustrative example of display screen 550 generated by a media guidance application in accordance with some embodiments of the disclosure. In some embodiments, the interactive media guidance application overlays a digital effect or enhancement on a user-captured image that includes the user's friends and/or family in the recreated scene. Subsequent to calibration of the user device with the metadata of the reference image, the interactive media guidance application may present the user with an option to overlay a digital effect or enhancement to the image captured by the user device as illustrated in FIG. 4. By overlaying the digital effect or enhancement to the image including the user's friends and/or family, the user may recreate an augmented reality version of the scene as seen in the user's favorite film or television program but customized to include the user's friends and/or family. The interactive media guidance application may use a three-dimensional rendering engine and a digital overlay asset from the original rendered media asset to apply the digital overlay asset to user-captured image 552 based on the geographical location and/or the geospatial orientation of the captured image. The interactive media guidance application may generate for display notification 554 indicating the digital effect has been applied and provide option 556 to save the image or option 558 to dismiss the process.

FIG. 6 shows an illustrative example 600 of a user image data structure and a reference image data structure in accordance with some embodiments of the disclosure. In some embodiments, an image captured by the user device is associated with metadata stored in user-captured image data structure 602. This data structure includes geographical location 604 and geospatial orientation 610 for the captured image. The data structure includes geographical location 604 including latitude 606 and longitude 608 and geospatial orientation 610 including gyroscopic angle 612. In some embodiments, a reference image from a media asset is associated with metadata stored in reference image data structure 614. This data structure includes geographical location 616 and geospatial orientation 622 for the reference image. The data structure includes geographical location 616 including latitude 618 and longitude 620 and geospatial orientation 622 including gyroscopic angle 624. This information may be stored at the time the reference image from the media asset is recorded or appended at a later time. This data structure also includes information regarding media asset 626, title 628, e.g., "Sunset," timestamp 630 for the reference image, e.g., "10:45," and digital overlay asset 632, such as "robot.overlay." The data structures described above are exemplary and may exclude information or include additional information as appropriate for metadata associated with user-captured images or reference images.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

As referred to herein, an "interactive media guidance application," or a "media guidance application" or, sometimes, a "guidance application" is an application that allows a user to consume, and/or navigate to content. In some embodiments, the media guidance application may be provided as an online application (i.e., provided on a website), or as a stand-alone application on a server or a user device. In some embodiments, control circuitry installed on various devices and platforms may execute the media guidance application, as described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM").

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 7:
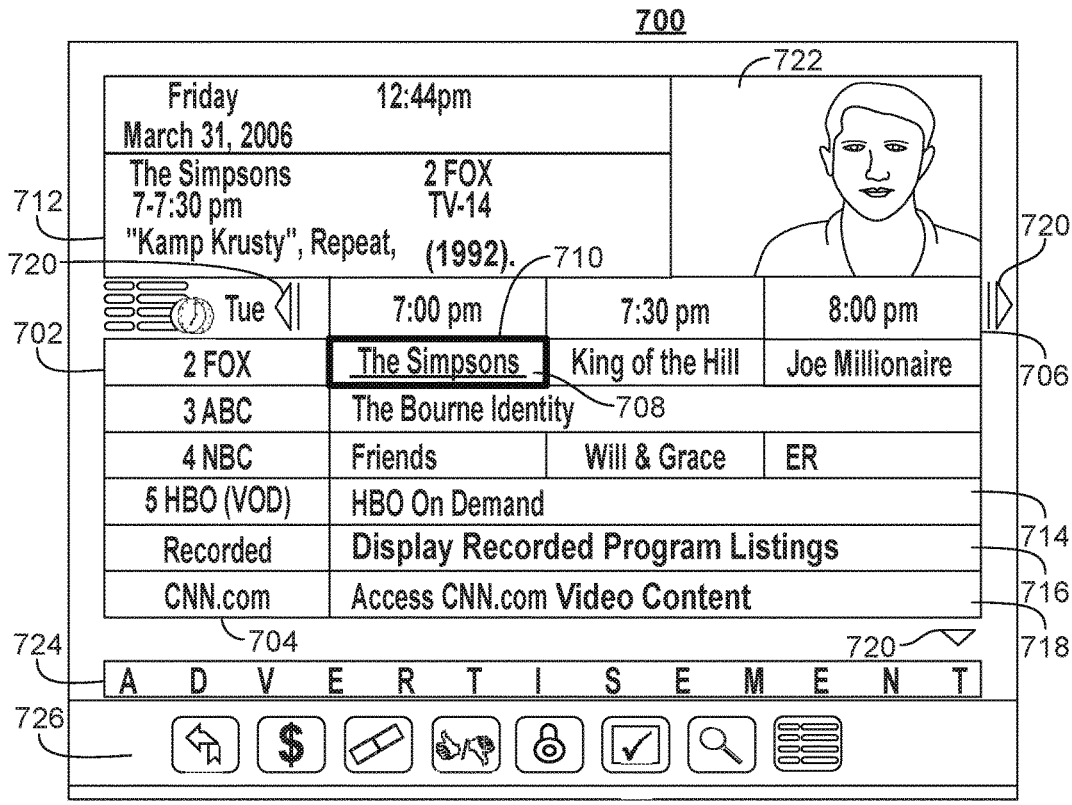
FIG. 7 shows yet another illustrative example of a display screen generated by a media guidance application in accordance with some embodiments of the disclosure.
Figure 8:
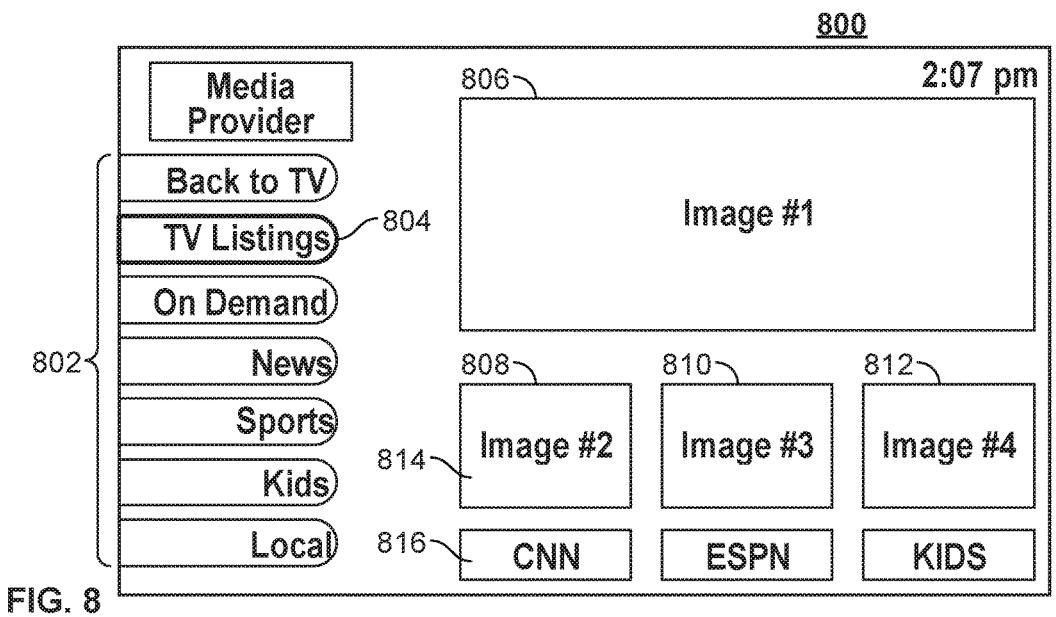
FIG. 8 shows yet another illustrative example of a display screen generated by a media guidance application in accordance with some embodiments of the disclosure.

FIGS. 7-8 show illustrative display screens that may be used to provide media guidance data. The display screens shown in FIGS. 7-8 may be implemented on any suitable user equipment device or platform. While the displays of FIGS. 7-8 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 7 shows illustrative grid of a program listings display 700 arranged by time and channel that also enables access to different types of content in a single display. Display 700 may include grid 702 with: (1) a column of channel/content type identifiers 704, where each channel/content type identifier (which is a cell in the column) identifies a different channel or content type available; and (2) a row of time identifiers 706, where each time identifier (which is a cell in the row) identifies a time block of programming. Grid 702 also includes cells of program listings, such as program listing 708, where each listing provides the title of the program provided on the listing's associated channel and time. With a user input device, a user can select program listings by moving highlight region 710. Information relating to the program listing selected by highlight region 710 may be provided in program information region 712. Region 712 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 702 may provide media guidance data for non-linear programming including on-demand listing 714, recorded content listing 716, and Internet content listing 718. A display combining media guidance data for content from different types of content sources is sometimes referred to as a "mixed-media" display. Various permutations of the types of media guidance data that may be displayed that are different than display 700 may be based on user selection or guidance application definition (e.g., a display of only recorded and broadcast listings, only on-demand and broadcast listings, etc.). As illustrated, listings 714, 716, and 718 are shown as spanning the entire time block displayed in grid 702 to indicate that selection of these listings may provide access to a display dedicated to on-demand listings, recorded listings, or Internet listings, respectively. In some embodiments, listings for these content types may be included directly in grid 702. Additional media guidance data may be displayed in response to the user selecting one of the navigational icons 720. (Pressing an arrow key on a user input device may affect the display in a similar manner as selecting navigational icons 720.)

Display 700 may also include video region 722, and options region 726. Video region 722 may allow the user to view and/or preview programs that are currently available, will be available, or were available to the user. The content of video region 722 may correspond to, or be independent from, one of the listings displayed in grid 702. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 726 may allow the user to access different types of content, media guidance application displays, and/or media guidance application features. Options region 726 may be part of display 700 (and other display screens described herein), or may be invoked by a user by selecting an on-screen option or pressing a dedicated or assignable button on a user input device. The selectable options within options region 726 may concern features related to program listings in grid 702 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 10. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 8. Video mosaic display 800 includes selectable options 802 for content information organized based on content type, genre, and/or other organization criteria. In display 800, television listings option 804 is selected, thus providing listings 806, 808, 810, and 812 as broadcast program listings. In display 800 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 808 may include more than one portion, including media portion 814 and text portion 816. Media portion 814 and/or text portion 816 may be selectable to view content in full-screen or to view information related to the content displayed in media portion 814 (e.g., to view listings for the channel that the video is displayed on).

The listings in display 800 are of different sizes (i.e., listing 806 is larger than listings 808, 810, and 812), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 9:
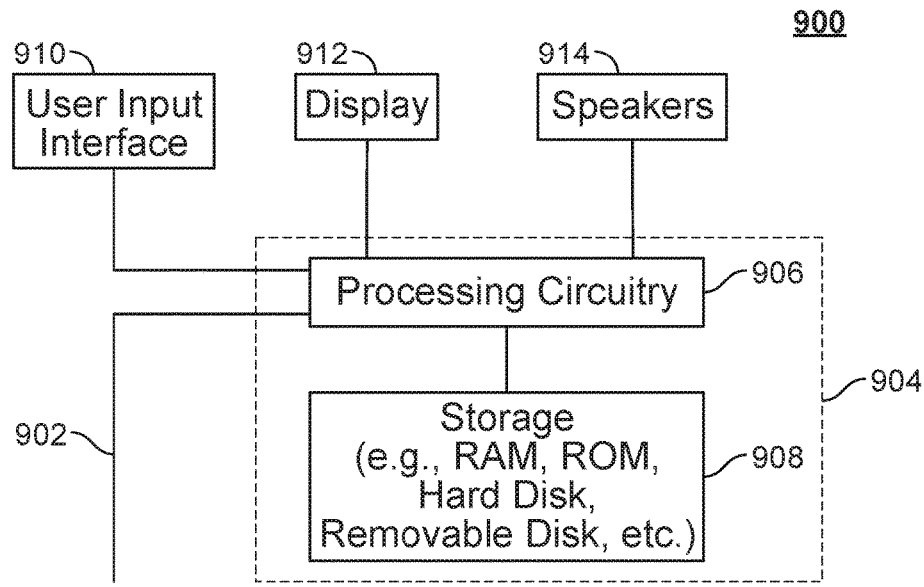
FIG. 9 is a block diagram of an illustrative user equipment device in accordance with some embodiments of the disclosure.

Users may access content and the media guidance application (and its display screens described above and below) from one or more of their user equipment devices. FIG. 9 shows a generalized embodiment of illustrative user equipment device 900. More specific implementations of user equipment devices are discussed below in connection with FIG. 10. User equipment device 900 may receive content and data via input/output (hereinafter "I/O") path 902. I/O path 902 may provide content (e.g., broadcast programming, on-demand programming, Internet content, content available over a local area network (LAN) or wide area network (WAN), and/or other content) and data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing.

Control circuitry 904 may be based on any suitable processing circuitry such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for a media guidance application stored in memory (i.e., storage 908). Specifically, control circuitry 904 may be instructed by the media guidance application to perform the functions discussed above and below. For example, the media guidance application may provide instructions to control circuitry 904 to generate the media guidance displays. In some implementations, any action performed by control circuitry 904 may be based on instructions received from the media guidance application.

In client-server based embodiments, control circuitry 904 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 10). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media guidance data described above. Nonvolatile memory may also be used (e.g., to launch a boot-up routine and other instructions). Cloud-based storage, described in relation to FIG. 10, may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of the user equipment 900. Circuitry 904 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 900, the tuning and encoding circuitry (including multiple tuners) may be associated with storage 908.

A user may send instructions to control circuitry 904 using user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of user equipment device 900. For example, display 912 may be a touchscreen or touch-sensitive display. In such circumstances, user input interface 910 may be integrated with or combined with display 912. Display 912 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 912 may be HDTV-capable. In some embodiments, display 912 may be a 3D display, and the interactive media guidance application and any suitable content may be displayed in 3D. A video card or graphics card may generate the output to the display 912. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 904. The video card may be integrated with the control circuitry 904. Speakers 914 may be provided as integrated with other elements of user equipment device 900 or may be stand-alone units. The audio component of videos and other content displayed on display 912 may be played through speakers 914. In some embodiments, the audio may be distributed to a receiver (not shown), which processes and outputs the audio via speakers 914.

The guidance application may be implemented using any suitable architecture. For example, it may be a stand-alone application wholly-implemented on user equipment device 900. In such an approach, instructions of the application are stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to generate any of the displays discussed herein. Based on the processed instructions, control circuitry 904 may determine what action to perform when input is received from input interface 910. For example, movement of a cursor on a display up/down may be indicated by the processed instructions when input interface 910 indicates that an up/down button was selected.

In some embodiments, the media guidance application is a client-server based application. Data for use by a thick or thin client implemented on user equipment device 900 is retrieved on-demand by issuing requests to a server remote to the user equipment device 900. In one example of a client-server based guidance application, control circuitry 904 runs a web browser that interprets web pages provided by a remote server. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on equipment device 900. This way, the processing of the instructions is performed remotely by the server while the resulting displays are provided locally on equipment device 900. Equipment device 900 may receive inputs from the user via input interface 910 and transmit those inputs to the remote server for processing and generating the corresponding displays. For example, equipment device 900 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to equipment device 900 for presentation to the user.

In some embodiments, the media guidance application is downloaded and interpreted or otherwise run by an interpreter or virtual machine (run by control circuitry 904). In some embodiments, the guidance application may be encoded in the ETV Binary Interchange Format (EBIF), received by control circuitry 904 as part of a suitable feed, and interpreted by a user agent running on control circuitry 904. For example, the guidance application may be an EBIF application. In some embodiments, the guidance application may be defined by a series of JAVA-based files that are received and run by a local virtual machine or other suitable middleware executed by control circuitry 904. In some of such embodiments (e.g., those employing MPEG-2 or other digital media encoding schemes), the guidance application may be, for example, encoded and transmitted in an MPEG-2 object carousel with the MPEG audio and video packets of a program.

Figure 10:
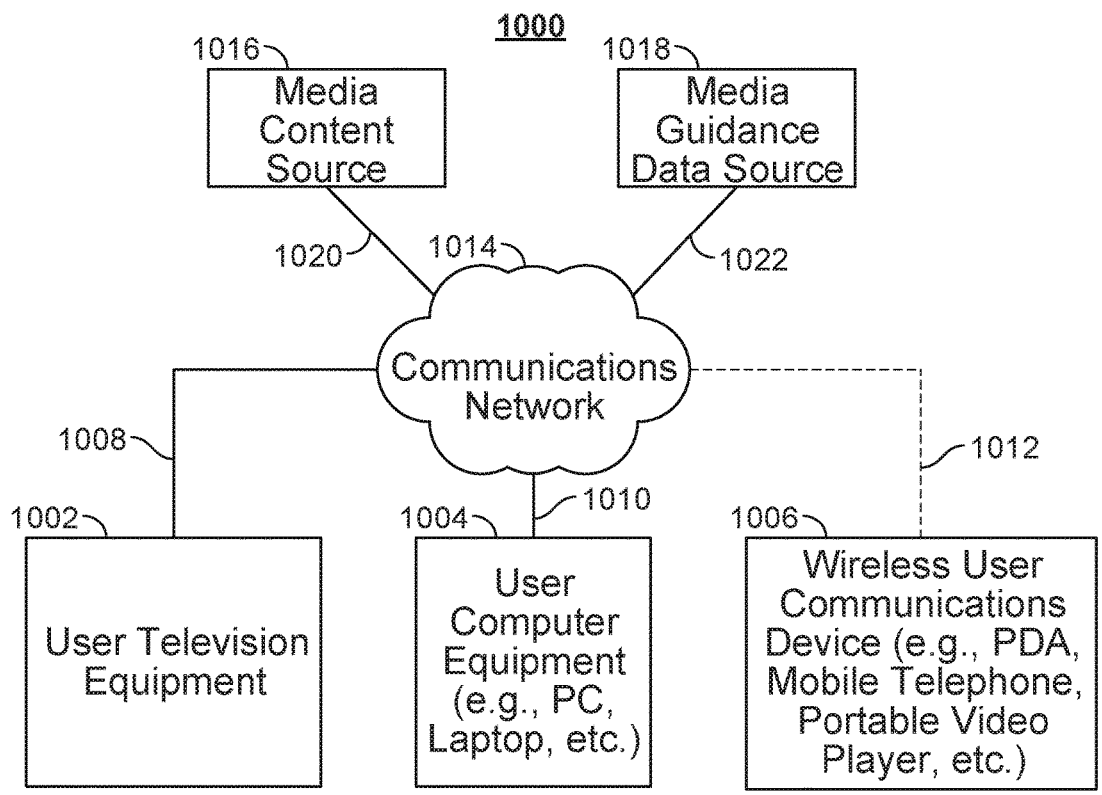
FIG. 10 is a block diagram of an illustrative media system in accordance with some embodiments of the disclosure.

User equipment device 900 of FIG. 9 can be implemented in system 1000 of FIG. 10 as user television equipment 1002, user computer equipment 1004, wireless user communications device 1006, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 9 may not be classified solely as user television equipment 1002, user computer equipment 1004, or a wireless user communications device 1006. For example, user television equipment 1002 may, like some user computer equipment 1004, be Internet-enabled allowing for access to Internet content, while user computer equipment 1004 may, like some television equipment 1002, include a tuner allowing for access to television programming. The media guidance application may have the same layout on various different types of user equipment or may be tailored to the display capabilities of the user equipment. For example, on user computer equipment 1004, the guidance application may be provided as a web site accessed by a web browser. In another example, the guidance application may be scaled down for wireless user communications devices 1006.

In system 1000, there is typically more than one of each type of user equipment device but only one of each is shown in FIG. 10 to avoid overcomplicating the drawing. In addition, each user may utilize more than one type of user equipment device and also more than one of each type of user equipment device.

In some embodiments, a user equipment device (e.g., user television equipment 1002, user computer equipment 1004, wireless user communications device 1006) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1014. Namely, user television equipment 1002, user computer equipment 1004, and wireless user communications device 1006 are coupled to communications network 1014 via communications paths 1008, 1010, and 1012, respectively. Communications network 1014 may be one or more networks including the Internet, a mobile phone network, mobile voice or data network (e.g., a 4G or LTE network), cable network, public switched telephone network, or other types of communications network or combinations of communications networks. Paths 1008, 1010, and 1012 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1012 is drawn with dotted lines to indicate that in the exemplary embodiment shown in FIG. 10 it is a wireless path and paths 1008 and 1010 are drawn as solid lines to indicate they are wired paths (although these paths may be wireless paths, if desired). Communications with the user equipment devices may be provided by one or more of these communications paths, but are shown as a single path in FIG. 10 to avoid overcomplicating the drawing.

Although communications paths are not drawn between user equipment devices, these devices may communicate directly with each other via communication paths, such as those described above in connection with paths 1008, 1010, and 1012, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1014.

System 1000 includes content source 1016 and media guidance data source 1018 coupled to communications network 1014 via communication paths 1020 and 1022, respectively. Paths 1020 and 1022 may include any of the communication paths described above in connection with paths 1008, 1010, and 1012. Communications with the content source 1016 and media guidance data source 1018 may be exchanged over one or more communications paths, but are shown as a single path in FIG. 10 to avoid overcomplicating the drawing. In addition, there may be more than one of each of content source 1016 and media guidance data source 1018, but only one of each is shown in FIG. 10 to avoid overcomplicating the drawing. (The different types of each of these sources are discussed below.) If desired, content source 1016 and media guidance data source 1018 may be integrated as one source device. Although communications between sources 1016 and 1018 with user equipment devices 1002, 1004, and 1006 are shown as through communications network 1014, in some embodiments, sources 1016 and 1018 may communicate directly with user equipment devices 1002, 1004, and 1006 via communication paths (not shown) such as those described above in connection with paths 1008, 1010, and 1012.

Content source 1016 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1016 may be the originator of content (e.g., a television broadcaster, a Webcast provider, etc.) or may not be the originator of content (e.g., an on-demand content provider, an Internet provider of content of broadcast programs for downloading, etc.). Content source 1016 may include cable sources, satellite providers, on-demand providers, Internet providers, over-the-top content providers, or other providers of content. Content source 1016 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1018 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1018 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1018 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1018 may provide user equipment devices 1002, 1004, and 1006 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 908, and executed by control circuitry 904 of a user equipment device 900. In some embodiments, media guidance applications may be client-server applications where only a client application resides on the user equipment device, and server application resides on a remote server. For example, media guidance applications may be implemented partially as a client application on control circuitry 904 of user equipment device 900 and partially on a remote server as a server application (e.g., media guidance data source 1018) running on control circuitry of the remote server. When executed by control circuitry of the remote server (such as media guidance data source 1018), the media guidance application may instruct the control circuitry to generate the guidance application displays and transmit the generated displays to the user equipment devices. The server application may instruct the control circuitry of the media guidance data source 1018 to transmit data for storage on the user equipment. The client application may instruct control circuitry of the receiving user equipment to generate the guidance application displays.

Content and/or media guidance data delivered to user equipment devices 1002, 1004, and 1006 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1000 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 10.

In one approach, user equipment devices may communicate with each other within a home network. User equipment devices can communicate with each other directly via short-range point-to-point communication schemes described above, via indirect paths through a hub or other similar device provided on a home network, or via communications network 1014. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1016 to access content. Specifically, within a home, users of user television equipment 1002 and user computer equipment 1004 may access the media guidance application to navigate among and locate desirable content. Users may also access the media guidance application outside of the home using wireless user communications devices 1006 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1014. These cloud resources may include one or more content sources 1016 and one or more media guidance data sources 1018. In addition or in the alternative, the remote computing sites may include other user equipment devices, such as user television equipment 1002, user computer equipment 1004, and wireless user communications device 1006. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1004 or wireless user communications device 1006 having content capture feature. Alternatively, the user can first transfer the content to a user equipment device, such as user computer equipment 1004. The user equipment device storing the content uploads the content to the cloud using a data transmission service on communications network 1014. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 9.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 11:
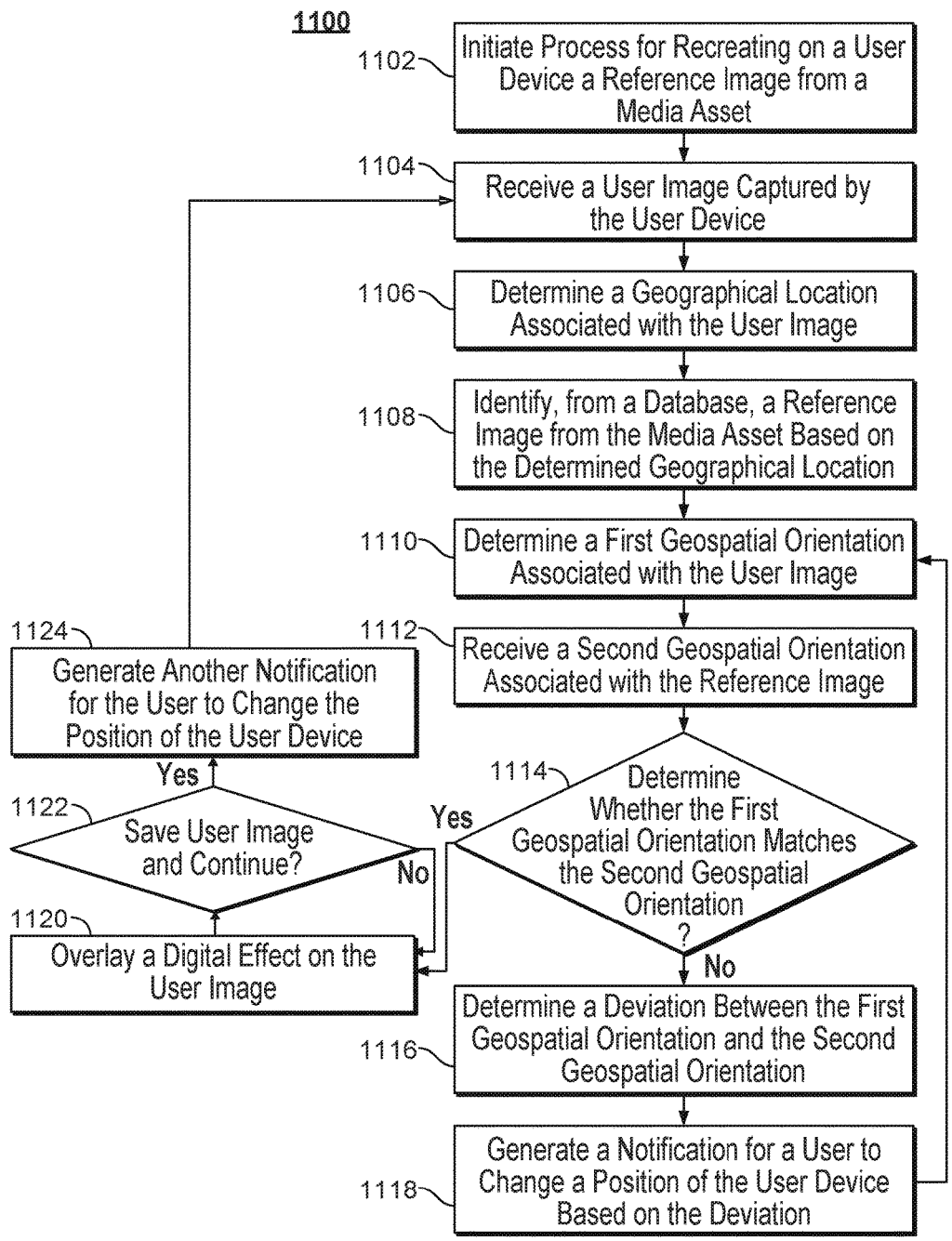
FIG. 11 is a flowchart of an illustrative process for recreating on a user device a reference image from a media asset in accordance with some embodiments of the disclosure.

FIG. 11 is a flowchart of an illustrative process 1100 for an interactive media guidance application implemented on control circuitry (e.g., control circuitry 904, FIG. 9) of a user device (e.g., user equipment device 900, FIG. 9) to recreate on a user device a reference image from a media asset in accordance with some embodiments of the disclosure.

At step 1102, the interactive media guidance application implemented on control circuitry 904 (FIG. 9) initiates a process to recreate on a user device a reference image from a media asset. In some embodiments, this algorithm may be encoded onto a non-transitory storage medium (e.g., storage device 908, FIG. 9) as a set of instructions to be decoded and executed by processing circuitry (e.g., processing circuitry 906, FIG. 9). Processing circuitry may in turn provide instructions to other sub-circuits contained within control circuitry 904 (FIG. 9), such as the tuning, video generating, encoding, decoding, encrypting, decrypting, scaling, analog/digital conversion circuitry, and the like.

At step 1104, the interactive media guidance application implemented on control circuitry 904 (FIG. 9) receives a user image captured by a user device, e.g., user equipment device 900 (FIG. 9). For example, the user device may include a camera component that captures an image at the user's current location, stores the image in a memory of the user device, and transmits the captured image to the interactive media guidance application.

At step 1106, the interactive media guidance application implemented on control circuitry 904 (FIG. 9) determines a geographical location associated with the user image. In some embodiments, the geographical location includes at least one of a latitude coordinate and a longitude coordinate. In some embodiments, at least one of the geographical location and the first geospatial orientation associated with the user image is determined from metadata extracted from the user image. For example, the interactive media guidance application may extract metadata from the captured image, analyze the extracted metadata for a data structure including geographical location information, such as latitude and longitude, and retrieve the geographical location from the data structure. For example, the interactive media guidance application may determine the geographical location associated with the user image to be latitude 47.6° N and longitude 122.3° W.

At step 1108, the interactive media guidance application implemented on control circuitry 904 (FIG. 9) identifies, from a database, the reference image from the media asset. In some embodiments, the database includes the media asset and the reference image tagged with the geographical location. In some embodiments, the interactive media guidance application receives, from the user, an indication of the media asset. The interactive media guidance application identifies, from the database, e.g., media content source 1016 or media guidance data source 1018 (FIG. 10), the reference image from the media asset based on the determined geographical location and the indication of the media asset. For example, the interactive media guidance application may transmit a query to the database using the geographical location associated with the user image of latitude 47.6° N and longitude 122.3° W. The interactive media guidance application may include a threshold range of, e.g., +0.5° and −0.5°. The interactive media guidance application may receive a response from the database indicating the reference image having associated geographical location of latitude 47.5° N and longitude 122.4° W. The interactive media guidance application may select the reference image as the closest match based on the geographical location of the user image.

At step 1110, the interactive media guidance application implemented on control circuitry 904 (FIG. 9) determines a first geospatial orientation associated with the user image. In some embodiments, the first geospatial orientation includes one or more gyroscopic angles. In some embodiments, at least one of the geographical location and the first geospatial orientation associated with the user image is determined from metadata extracted from the user image. For example, the interactive media guidance application may extract metadata from the reference image. The interactive media guidance application may analyze the extracted metadata for a data structure including geospatial orientation information. For example, the interactive media guidance application may determine the geospatial orientation associated with the user image to include a gyroscopic angle of 90°.

At step 1112, the interactive media guidance application implemented on control circuitry 904 (FIG. 9) receives a second geospatial orientation associated with the reference image. In some embodiments, the second geospatial orientation includes one or more gyroscopic angles. For example, the interactive media guidance application may receive the geospatial orientation associated with the reference image to include a gyroscopic angle of 85°.

At step 1114, the interactive media guidance application implemented on control circuitry 904 (FIG. 9) determines whether the first geospatial orientation matches the second geospatial orientation. For example, the interactive media guidance application may subtract the user image's gyroscopic angle of 90° from the reference image's gyroscopic angle of 85° and determine they do not match based on a non-zero result. If the interactive media guidance application implemented on control circuitry 904 (FIG. 9) determines that the first geospatial orientation does not match the second geospatial orientation, the interactive media guidance application proceeds to step 1116. If the interactive media guidance application implemented on control circuitry 904 (FIG. 9) determines that the first geospatial orientation matches the second geospatial orientation, the interactive media guidance application proceeds to step 1120.

At step 1116, based on the first geospatial orientation not matching the second geospatial orientation, the interactive media guidance application implemented on control circuitry 904 (FIG. 9) determines a deviation between the first geospatial orientation and the second geospatial orientation. For example, the interactive media guidance application may subtract the user image's gyroscopic angle of 90° from the reference image's gyroscopic angle of 85° and determine the deviation to be 5°.

At step 1118, the interactive media guidance application implemented on control circuitry 904 (FIG. 9) generates a notification for a user to change a position of the user device based on the deviation. For example, the interactive media guidance application may generate a notification for a user to change the position of the user device and transmit for display on the user device's display component. The interactive media guidance application may generate a set of static arrows and a set of dynamic arrows to be overlaid on the user image as it is being displayed on the user device. The set of dynamic arrows may be displaced with respect to the set of static arrows to indicate the deviation between the gyroscopic orientations. As the user changes position, the two sets of arrows may line up and indicate that the deviation between the gyroscopic orientations is decreasing.

At step 1120, based on the first geospatial orientation matching the second geospatial orientation (e.g., deviation being zero or below a predefined threshold), the interactive media guidance application implemented on control circuitry 904 (FIG. 9) overlays a digital effect on the user image. For example, after the deviation between the geospatial orientations reaches within the predefined threshold, e.g., 0.5°, the interactive media guidance application may overlay the digital effect on the user image. The interactive media guidance application may retrieve information regarding the digital effect from the metadata associated with the reference image, e.g., "robot.overlay." The interactive media guidance application may retrieve the digital effect asset from the database and initiate a digital image processing algorithm to apply the digital effect to the user image. For example, the interactive media guidance application may compare each pixel of the digital effect asset with respect to the user image and alter the pixels in the user image where the digital effect is expected to be applied but not alter the pixels in the user image where the digital effect is not expected to be applied.

At step 1122, the interactive media guidance application implemented on control circuitry 904 (FIG. 9) optionally prompts the user whether to save the user image overlaid with the digital effect and proceed to capture a user image for the next frame in the scene. If the interactive media guidance application implemented on control circuitry 904 (FIG. 9) receives an affirmative response from the user, the interactive media guidance application implemented on control circuitry 904 (FIG. 9) proceeds to step 1124. Otherwise if the interactive media guidance application implemented on control circuitry 904 (FIG. 9) receives a negative response from the user, the interactive media guidance application implemented on control circuitry 904 (FIG. 9) returns to step 1120. In some embodiments, the interactive media guidance application implemented on control circuitry 904 (FIG. 9) may end the process in response to receiving a negative response from the user.

At step 1124, subsequent to overlaying the digital effect on the user image, the interactive media guidance application implemented on control circuitry 904 (FIG. 9) generates another notification for the user to change the position of the user device. For example, the interactive media guidance application may generate another notification for the user to change the position of the user device to capture an image for the next frame in the scene. The interactive media guidance application may transmit for display on the user device's display component. The interactive media guidance application may generate a set of static arrows and a set of dynamic arrows to be overlaid on the user image as it is being displayed on the user device. The set of dynamic arrows may be displaced with respect to the set of static arrows to indicate the deviation between the gyroscopic orientations. As the user changes position, the two sets of arrows may line up and indicate that the deviation between the gyroscopic orientations is decreasing. The interactive media guidance application may receive user input to dismiss and end the process at step 1124. Alternatively, the interactive media guidance application may proceed to step 1104.

Subsequent to step 1124, following steps 1104 and onwards, the interactive media guidance application implemented on control circuitry 904 (FIG. 9) receives a second user image captured by the user device. The interactive media guidance application identifies, from the database, a second reference image from the media asset. For example, the camera component in the user device may capture an image at the user's current location, store the image in a memory of the user device, and transmit the captured image to the interactive media guidance application. The interactive media guidance application may extract metadata from the captured image, analyze the extracted metadata for a data structure including geographical information, such as latitude and longitude, and retrieve the geographical location from the data structure.

In some embodiments, based on a second deviation between geospatial orientation for the second user image and geospatial orientation for the second reference image being below the predefined threshold, interactive media guidance application implemented on control circuitry 904 (FIG. 9) overlays a second digital effect on the second user image. For example, after the deviation between the geospatial orientations reaches within the predefined threshold, e.g., 0.5°, the interactive media guidance application may overlay the digital effect on the user image. The interactive media guidance application may retrieve information regarding the digital effect from the metadata associated with the reference image, e.g., "robot2.overlay." The interactive media guidance application may retrieve the digital effect asset from the database and initiate a digital image processing algorithm to apply the digital effect to the user image. For example, the interactive media guidance application may compare each pixel of the digital effect asset with respect to the user image and alter the pixels in the user image where the digital effect is expected to be applied but not alter the pixels in the user image where the digital effect is not expected to be applied.

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, conditional statements and logical evaluations, such as those at step 1114, may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 9-10 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for recreating on a user device a reference image from a media asset, comprising:
    receiving a user image captured by the user device;
    determining a geographical location associated with the user image;
    based on the determined geographical location:
        identifying, from a database, the reference image from the media asset;
        determining a first geospatial orientation of the user device based on a view shown in the user image;
        receiving a second geospatial orientation of an imaging device that was used to generate the reference image;
        determining whether the first geospatial orientation matches the second geospatial orientation;
        based on the first geospatial orientation not matching the second geospatial orientation:
            determining a deviation between the first geospatial orientation and the second geospatial orientation;
            generating a notification for a user to change a position of the user device to approximate the second geospatial orientation based on the deviation; and
            receiving an updated user image captured by the user device placed at the changed position that approximates the second geospatial orientation.

2. The method of claim 1, wherein the geographical location includes at least one of a latitude coordinate and a longitude coordinate.

3. The method of claim 1, wherein the first geospatial orientation includes one or more gyroscopic angles.

4. The method of claim 1, wherein the database includes the media asset and the reference image tagged with the geographical location.

5. The method of claim 4, comprising:
    receiving, from the user, an indication of the media asset;
    identifying, from the database, the reference image from the media asset based on the determined geographical location and the indication of the media asset.

6. The method of claim 1, wherein at least one of the geographical location and the first geospatial orientation associated with the user image is determined from metadata extracted from the user image.

7. The method of claim 1, comprising:
    based on the deviation between the first geospatial orientation and the second geospatial orientation being below a predefined threshold, overlaying a digital effect on the user image.

8. The method of claim 7, comprising:
    subsequent to overlaying the digital effect on the user image, generating another notification for the user to change the position of the user device.

9. The method of claim 8, comprising:
    receiving a second user image captured by the user device;
    identifying, from the database, a second reference image from the media asset.

10. The method of claim 9, comprising:
    based on a second deviation between geospatial orientation for the second user image and geospatial orientation for the second reference image being below the predefined threshold, overlaying a second digital effect on the second user image.

11. A system for recreating on a user device a reference image from a media asset, comprising:
    the user device;
    control circuitry configured to:
        receive a user image captured by the user device;
        determine a geographical location associated with the user image;
        based on the determined geographical location:
            identify, from a database, the reference image from the media asset;
            determine a first geospatial orientation of the user device based on a view shown in the user image;
            receive a second geospatial orientation of an imaging device that was used to generate the reference image;
            determine whether the first geospatial orientation matches the second geospatial orientation;
            based on the first geospatial orientation not matching the second geospatial orientation:
                determine a deviation between the first geospatial orientation and the second geospatial orientation;
                generate a notification for a user to change a position of the user device to approximate the second geospatial orientation based on the deviation; and
                receive an updated user image captured by the user device placed at the changed position that approximates the second geospatial orientation.

12. The system of claim 11, wherein the geographical location includes at least one of a latitude coordinate and a longitude coordinate.

13. The system of claim 11, wherein the first geospatial orientation includes one or more gyroscopic angles.

14. The system of claim 11, wherein the database includes the media asset and the reference image tagged with the geographical location.

15. The system of claim 14, wherein the control circuitry is configured to:
    receive, from the user, an indication of the media asset;
    identify, from the database, the reference image from the media asset based on the determined geographical location and the indication of the media asset.

16. The system of claim 11, wherein at least one of the geographical location and the first geospatial orientation associated with the user image is determined from metadata extracted from the user image.

17. The system of claim 11, wherein the control circuitry is configured to:
   based on the deviation between the first geospatial orientation and the second geospatial orientation being below a predefined threshold, overlay a digital effect on the user image.

18. The system of claim 17, wherein the control circuitry is configured to:
   subsequent to overlaying the digital effect on the user image, generate another notification for the user to change the position of the user device.

19. The system of claim 18, wherein the control circuitry is configured to:
   receive a second user image captured by the user device;
   identify, from the database, a second reference image from the media asset.

20. The system of claim 19, wherein the control circuitry is configured to:
   based on a second deviation between geospatial orientation for the second user image and geospatial orientation for the second reference image being below the predefined threshold, overlay a second digital effect on the second user image.

* * * * *